(12) United States Patent
Klein et al.

(10) Patent No.: US 8,149,421 B1
(45) Date of Patent: Apr. 3, 2012

(54) OPTICAL HOMODYNE INTERFEROMETER

(75) Inventors: Marvin Klein, Pacific Palisades, CA (US); Konstantin Shcherbin, Kiev (UA)

(73) Assignee: Optech Ventures, LLC, Torrance, CA (US)

( * ) Notice: Subject to any disclaimer, the term of this patent is extended or adjusted under 35 U.S.C. 154(b) by 837 days.

(21) Appl. No.: 12/144,601

(22) Filed: Jun. 23, 2008

(51) Int. Cl.
*G01B 11/02* (2006.01)

(52) U.S. Cl. ........................ 356/502; 356/450

(58) Field of Classification Search .............. 356/498, 356/502
See application file for complete search history.

(56) References Cited

U.S. PATENT DOCUMENTS

| | | | |
|---|---|---|---|
| 4,659,224 A | | 4/1987 | Monchalin |
| 5,131,748 A | | 7/1992 | Monchalin et al. |
| 5,585,921 A | | 12/1996 | Pepper et al. |
| 5,680,212 A | * | 10/1997 | Blouin et al. ............... 356/458 |
| 5,684,592 A | | 11/1997 | Mitchell et al. |
| 5,847,851 A | * | 12/1998 | Wechsler et al. ............. 359/7 |
| 5,900,935 A | * | 5/1999 | Klein et al. ................. 356/502 |
| 6,486,959 B2 | * | 11/2002 | Delaye et al. .............. 356/457 |
| 6,819,432 B2 | * | 11/2004 | Pepper et al. .............. 356/498 |
| 2001/0015809 A1 | * | 8/2001 | Klein et al. ................ 356/502 |

OTHER PUBLICATIONS

Magnusson, Robert. "Experiments with photorefractive crystals for holographic interferometry", Feb. 1994, Optical Engineering, vol. 33 No. 2, p. 596-607.*

* cited by examiner

*Primary Examiner* — Tarifur Chowdhury
*Assistant Examiner* — Jonathan Hansen
(74) *Attorney, Agent, or Firm* — Lawrence S. Cohen

(57) ABSTRACT

Faults, dimensions and other characteristics of a material or structure are sensed by a coherent beam's reflection from the material when probed with ultrasonic waves or when vibrating at high frequencies. The reflected beam acquires a dynamic phase change substantially different from its original phase and from the phase of a reference beam split from the common source beam. The reflected beam and the reference beam are superimposed by diffraction in an adaptive holographic beam-splitter, and the superimposed beams are detected by a photodetector capable of detecting small phase changes from ultrasonic surface displacements or perturbations. An apparatus and method are disclosed defining an improved crystal homodyne interferometer with an energy source coupled to the crystal and operative to maintain the crystal in a condition for emptying unwanted traps in the crystal.

21 Claims, 5 Drawing Sheets

OPTICAL HOMODYNE INTERFEROMETER

FIELD OF THE INVENTION

The present invention relates to the art of detecting faults and other characteristics in materials, and more particularly to methods and apparatus for detecting faults and other characteristics in ultrasonically vibrated test material using crystal homodyne interferometers.

BACKGROUND OF THE INVENTION

Laser ultrasonic receivers based on optical homodyne interferometers have been investigated for some years. One such receiver is disclosed in U.S. Pat. No. 5,900,935 issued May 4, 1999. Such receivers have been used and proposed for the examination of materials, such as, for example, investigating transient body transformations, inspecting materials such as metals and ceramics at high temperatures for process and quality control, detecting flaws as soon as they are created, measuring production parameters such as thickness and temperature, and determining microstructural properties on-line such as grain size, porosity and the like. In early research, it was realized that a classical homodyne interferometer could not operate effectively with the speckled beams that result from reflecting from rough surfaces. Furthermore, such early homodyne interferometers could not compensate for dynamic changes in the signal beam wavefront resulting from slow, environmental disturbances.

Time-delay or self-referencing interferometers have been developed, such as the confocal Fabry-Perot which allow the processing of light scattered from rough surfaces with a large field of view. Usually, a phase modulated signal beam is derived from a probe beam scattered or reflected from a vibrating test surface. This beam is demodulated by the slope of the transfer function, which is the transmission versus frequency, of the confocal Fabry-Perot. As a self-referencing or time-delay interferometer, the confocal Fabry-Perot has the ability to process speckled beams from imperfect surfaces. In addition, the particular mirror curvature of the confocal Fabry-Perot provides a much larger field of view than a Fabry-Perot with flat mirrors. The operation of the confocal Fabry-Perot is described in, for example, U.S. Pat. No. 4,659,224. However, the confocal Fabry-Perot requires stabilization of the interferometer length to a fraction of an optical wavelength, thereby adding complexity and cost to the receiver.

The transmitted signal from a confocal Fabry-Perot is proportional to the amplitude of the Doppler shift of the signal beam frequency upon scattering from a vibrating surface. For constant displacement, the Doppler shift decreases with frequency. As a result, the confocal Fabry-Perot does not work well at ultrasonic frequencies below approximately one megahertz (1 MHz).

Solutions to such problems and limitations have been proposed. See, for example, U.S. Pat. No. 5,131,748 to Monchalin and Ing, where the beam that probes the vibrating surface is caused to interfere inside a photorefractive material with a reference or pump beam, resulting in these two beams diffracting in each other's direction with a common path and a common wavefront. An electrical signal dependent on phase excursions or perturbations in the reflected or scattered beam produced by the surface vibration is then obtained by a photodetector in one of these paths. For the correct static phase difference between the wavefronts of the two interfering beams, the electrical signal is linearly proportional to the phase excursion and thus to the surface displacement. The photorefractive material acts in effect as a real-time hologram providing an exact overlap of the reference beam with the signal beam for later coherent detection and compensation for low frequency dynamic environmental distortions in the signal wavefront. Effective dynamic compensation requires that the response time of the real-time hologram be on the order of 10-100 microseconds while maintaining high diffraction efficiency.

In operation of a homodyne interferometer having an adaptive holographic beam splitter, a coherent, polarized light beam is split, one of the beams being used as a reference beam. The other beam is reflected or scattered from a surface of the material which is vibrated by an ultrasonic frequency source. The reflected beam has its phase shifted in proportion to the surface deflection or perturbation and is impinged on the surface of a multiple quantum well adaptive holographic beam splitter. The reference beam is also impinged onto the surface of the multiple quantum well adaptive holographic beam splitter to create effectively an interference of the two beams, resulting in a refractive index and/or an absorption grating. This grating causes the beams to diffract into each other, so that the original beam and the diffracted beam are co-propagating and have identical wavefronts. The beam with superposed wavefronts is received by a photodetector which senses the high frequency dynamic phase difference between the two beams and produces a signal representative of the perturbations of the vibrating test surface.

Interferometers using homodyne detection with dynamic wavefront compensation differ from classic interferometers in that the final and critical step of combining the signal and reference beams is performed by a photorefractive crystal acting as a real time hologram. The mixing process in this crystal is known as two-wave mixing. There are three benefits to the use of two-wave mixing as a means for generating a real time hologram. First, a plane wave reference beam can be combined with a speckled signal beam and have perfect spatial overlap for mixing at the photodetector. Second, the spatial phase of the photorefractive grating insures that the phases of the two combining beams are exactly in quadrature, which is the requirement for linear detection. The third benefit needs some explanation. The photorefractive grating has a finite response time. For any phase changes in either arm that occur on a slower time scale, the crystal can respond, the spatial grating accommodates to the changes and thus no signal is detected. For any phase changes that happen rapidly compared with the response time (i.e. the ultrasonic signals), the grating is frozen temporally and spatially, and simply acts as a static hologram that combines the two beams. Put in another way, the crystal acts as a high-pass filter, with a cutoff frequency determined roughly by the inverse of the response time. Slow perturbations are compensated, while fast ultrasonic phase changes are optimally detected. This high-pass property is a major benefit. In a real application it is desirable to reject all (low frequency) mechanical perturbations (jamming signals), while optimally detecting the desired ultrasonic signals. The effectiveness of the filtering depends largely on the value of the cutoff frequency. Ideally, it should be 1-10 kHz for good jamming rejection. The frequency response should also drop as fast as possible below the cutoff frequency.

For a given wavelength of operation, certain crystals are preferred, based on their wavelength response. Although applicable to all II-VI semiconductor crystals, at the wavelength of 1550 nm, one of the best crystals is CdTe doped with V or Ge. These crystals are characterized by a low frequency tail in their frequency response that is undesirable and which is not predicted from a basic model and not seen in other types of crystals. It is desired that the response at low frequencies not only be small, but in fact be much smaller (by orders of magnitude) than the response at high frequencies.

DEFINITIONS

Unwanted Traps

The photorefractive effect requires a set of traps near the center of the bandgap of the crystal. These traps, referred to as "deep traps" provide a source of charge that are photoionized and then migrate and recombine to form the grating required for operation. Deep traps are states where energy levels are well into the gap between the conduction band and the valence band. In the illustrative crystal, CdTe, there is a second set of traps which are more shallow (nearer the conduction or valence band) and which also contribute to the grating. These traps also contribute to the frequency response in an undesirable way and are referred to as unwanted.

Coupling Efficiency

A term used to describe the strength of the grating formation process. It refers to the grating strength or the efficiency of the adaptive beam splitter.

Tmin

The minimum temperature required to substantially empty the shallow traps and thus improve the frequency response of the crystal.

Tmax

The temperature at which deep traps near the center of the bandgap of the crystal start to substantially empty, resulting in a reduction in detection efficiency.

Joule Heating

The crystal requires an applied voltage for operation. In the presence of this voltage, the finite resistance of the crystal leads to an induced current. The power dissipated or the heat deposited into the crystal is the product of the voltage and the current. This is Joule (or Ohmic) heating.

Thermal Runaway

The current in the crystal is proportional to the conductivity of the crystal and results in the (Joule) heating of the crystal. As the crystal temperature rises, the conductivity increases and thus the current and dissipated power increase. More heating occurs, the current and temperature rise faster and so on. This process is termed thermal runaway.

BRIEF DESCRIPTION OF THE INVENTION

The inventors have determined that the cause for the low frequency tail is the presence of a set of unwanted traps (from impurities) having its own grating and its own (lower) cutoff frequency. The inventors have determined also that by exposing the crystal to energy which empties the unwanted traps the low frequency tail is eliminated. This is accomplished in accordance with the principles of this invention by (1) controlling the temperature of the crystal by, for example, a thermoelectric element or by (2) exposure to light at infrared wavelengths. For (1) above, in order to empty the unwanted traps, the crystal is maintained at a temperature above Tmin. However, as the temperature rises above Tmin, the coupling coefficient of the gratings in the crystal starts to decrease. Thus there is also an upper limit on the temperature Tmax (>Tmin) at which the reduction in coupling coefficient is not excessive.

The invention also is based on the realization that maintaining the crystal at a temperature between Tmin and Tmax, the effects of Joule heating also are mitigated and thus thermal runaway is avoided. The temperatures Tmin and Tmax for CdTe crystals doped with germanium or vanadium (Ge or V) correspond to about 40-44 degrees Celsius, respectively. [these numbers will vary somewhat from crystal to crystal.] Consequently, the temperature control according to the invention is operative to maintain a CdTe crystal sufficiently below thermal runaway and between about 40-44 degrees Celsius to permit a controller to maintain the crystal at a temperature at which the best frequency response is achieved without substantially reducing grating strength (coupling efficiency). The thermal control of the crystal results in the suppression of the low frequency response thus achieved by emptying the unwanted set of traps.

In an embodiment of the invention in which light at infrared wavelengths is employed, the traps are photo ionized without the necessity of heating, and a heatsink is coupled to the crystal to prevent thermal runaway.

Other novel features which are believed to be characteristic of the invention, both as to organization and methods of operation, together with further objects and advantages thereof, will be better understood from the following description in which preferred embodiments of the invention are described by way of example.

DETAILED DESCRIPTION OF ILLUSTRATIVE EMBODIMENTS OF THIS INVENTION

Figure 1:
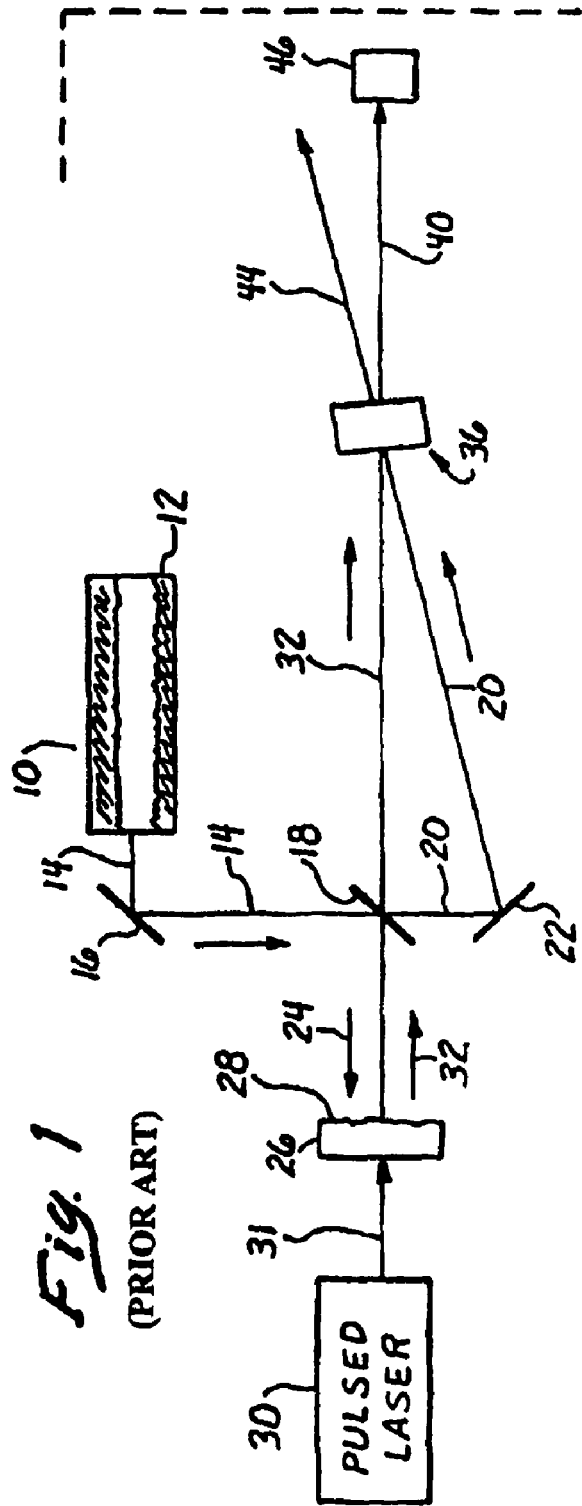
FIG. 1 is a schematic view of a homodyne interferometer system of the prior art, including a beam splitter and showing diagrammatically the paths of the signal and reference beams from generation to detection.

As shown in FIG. 1, the reference-beam interferometer two-wave mixing receiver 10 includes a laser generator 12 which generates as its output a coherent light beam 14. The light beam 14 is directed in the direction of the adjacent arrow by mirror 16 to beam splitter 18 which divides the beam 14 into a reference beam 20 passing through the splitter 18 and into a probe beam 24 directed toward the work piece or material 26 to be examined. The reference beam 20 is directed by mirror 22 for superposition with the signal wave, as will be described in greater detail below. The probe beam 24 is reflected or scattered from the normally rough surface 28 as the return signal beam 32 traveling back along its incident path.

The surface 28 of the work piece is vibrated ultrasonically as a result of a pulsed laser 30. The pulsed laser 30 produces a momentary light beam 31 impinging the work piece 26 to generate an ultrasonic wave that travels through the work piece 26 to result in a vibration of the work piece surface 28.

[the laser 30 could be directed onto any portion of the workpiece, not just the back surface shown in the figure.]

The vibration or displacement of the work piece surface will impart phase perturbations on the probe beam 24 when it is reflected back as the return signal beam 32. In addition, the rough surface of the work piece 26 and turbulence in the optical beam path causes spatial wavefront distortions on the return signal beam 32.

The distorted return signal beam 32 is guided toward the real-time crystal holographic element 36. The return signal beam 32 is combined or superposed with the reference beam 20 in the holographic element 36, which results in two output beams 40 and 44. The superposition of at least parts of the distorted return signal beam 32 and the reference beam 20 form, as the output, the beam 40, which is directed to the photodetector 46.

The difference in the cumulated path length of beam 20 and the path length of beams 24 and 32 between the beam splitter 18 and the receiving surface of the holographic element 36 should be less than the coherence length of the laser generator 10.

Figure 2:
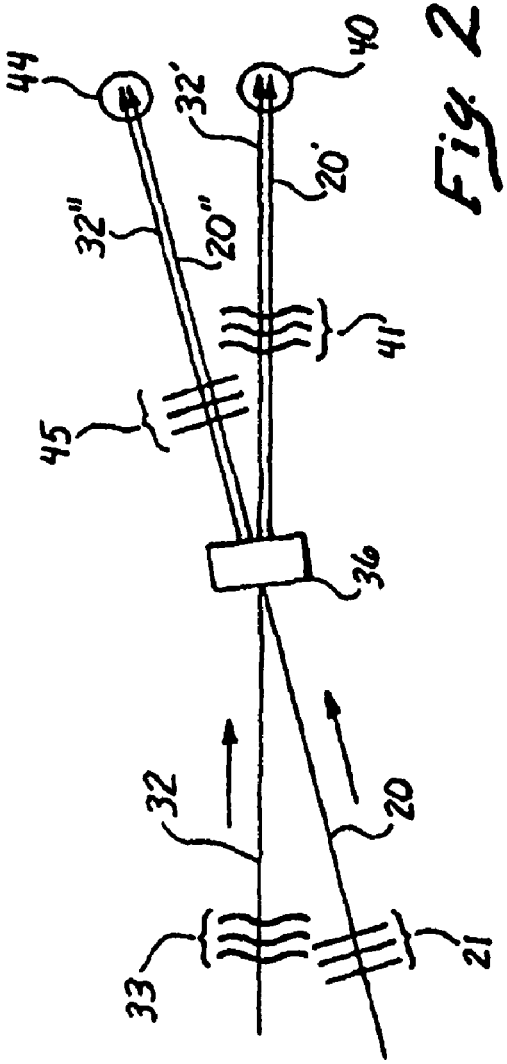
FIG. 2 is a schematic view of beam paths through the crystal beam splitter of FIG. 1 showing the beam paths in component detail.

The effect of the holographic element 36 on the incident beams 20, 32 is shown in greater detail in FIG. 2. The reference beam 20 is partially diffracted as beam 20' and superposed on the distorted beam 32 which is partially transmitted as beam 32'. The superposed components of the partially diffracted reference beam 20' and the partially transmitted signal beam 32' have identical paths and comprise the resultant beam 40 directed to the photodetector 46. The incident reference beam has planar wavefronts 21, while the incident distorted signal beam 32 has distorted wavefronts 33. The resultant beam 40 will have overlapped wavefronts 41 with the same distortion of wavefronts 33. The incident reference beam 20 is also partially transmitted through the holographic element 36 as component beam 20'', while the incident distorted beam 32 is partially diffracted by the element 36 as component beam 32''. The component beams 20'', 32'' have identical paths and comprise the resultant beam 44. The resultant beam 44 will have overlapped planar wavefronts 45.

In operation element 36 acts as an adaptive beam splitter matching the wavefronts of the return signal 32 and the reference beam 20. The return signal 32 acquires a phase perturbation relative to the phase of the reference beam 20 caused by the ultrasonic vibration of the surface 28.

When the reference beam 20 and the return signal beam 32 interfere in the photorefractive holographic element 36, they produce a refractive index grating that records the spatial phase profile of the return signal beam 32. This holographic recording and subsequent readout process yields an output beam 40 that is a composite or superposition of the partially transmitted signal beam 32' and the partially diffracted reference beam 20'. The holographic combination of these beams insures that they have precisely overlapped wavefronts.

The separate beams 20', 32' that contribute to the composite beam 40 have a static relative longitudinal phase difference apart from the phase perturbation acquired by the return signal 32 from the ultrasonic vibration of the work piece surface 28. The static relative longitudinal phase depends on the design of the holographic element 36 and on an applied electric field and on the chosen wavelength of the beam 14 from the laser generator 12. These factors determine a spatial shift of the index grating in the element 36 relative to the optical interference pattern created by the return beam 32 and the reference beam 20. This spatial shift contributes to the static relative longitudinal phase of the separate beams 20', 32' that contribute to the composite beam 40. Specifically, this static relative longitudinal phase is equal to the photorefractive phase shift plus or minus 90 degrees.

Optimally, the photorefractive phase shift is set to be near 0 degrees so that the static relative longitudinal phase is as close as possible to the 90 degree quadrature condition. No path-length stabilization is required to maintain this condition as with a conventional interferometer system. The required value of the photorefractive phase shift is produced by applying a DC electric field.

The relative longitudinal phase for the superposed output beam 40 is independent of any wavefront changes on the input beams 20, 32 due to turbulence, vibrations and the like as long as the wavefront changes occur on a time scale that is slow relative to the grating buildup time. The grating buildup time, as used in this specification, is the time required for the amplitude and phase of the refractive index grating to reach an appreciable fraction of their final steady-state value. The changes that occur very rapidly, such as the perturbations modulated on the return distorted signal beam 32 as a result of the ultrasonic vibrations of the work piece surface 28, will be transferred to the output beam 40 and be detected by the detector 46. It has been found that a suitable detector 46 may be a Model 1801 provided by New Focus, Inc. of Santa Clara, Calif.

Figure 3:
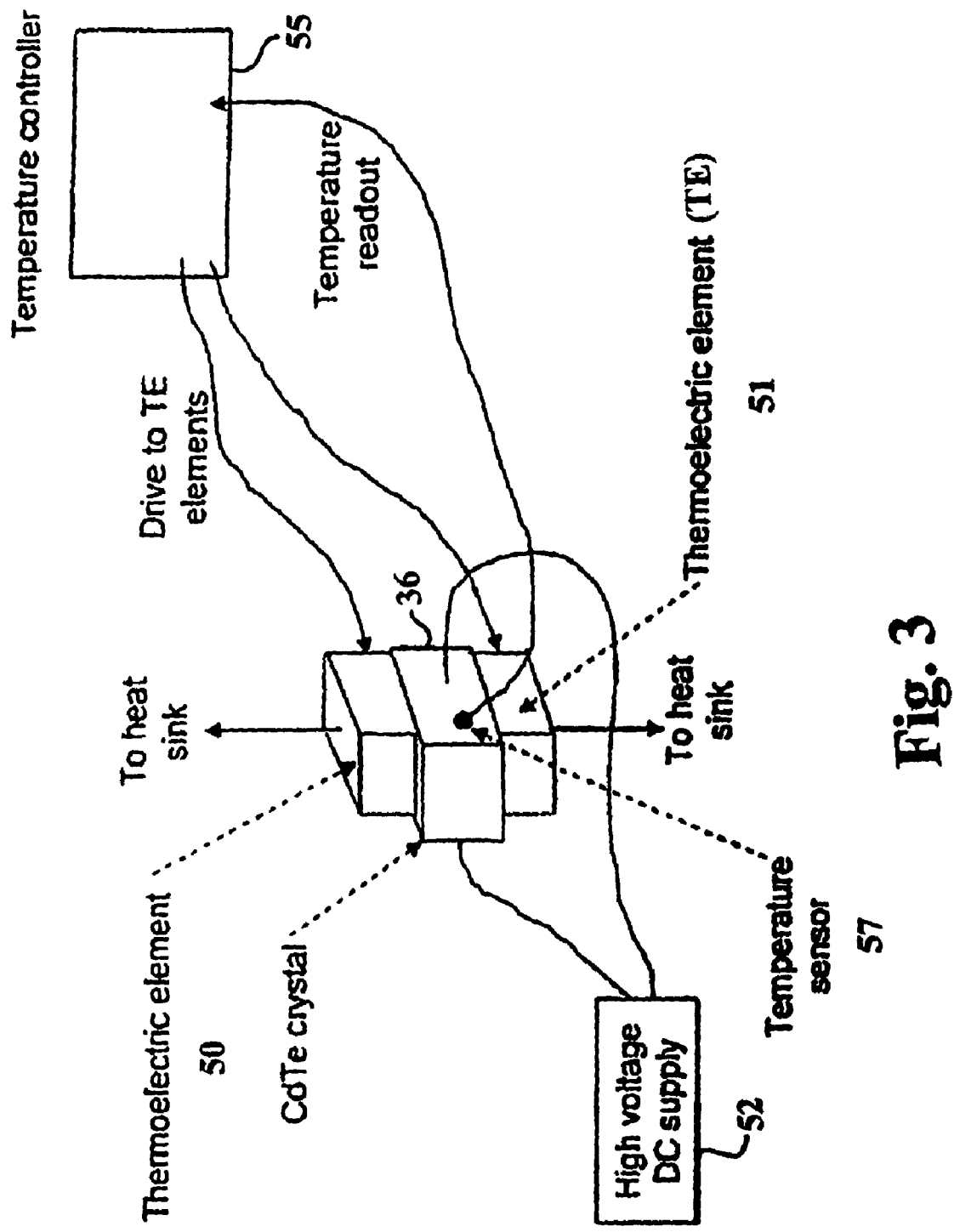
FIG. 3 is a schematic view of the crystal beam splitter of FIG. 1 with an illustrative heating arrangement adapted in accordance with the principles of this invention for eliminating unwanted traps from the crystal beam splitter of FIGS. 1 and 2.

FIG. 3 shows the real time holographic element 36 comprising a CdTe crystal sandwiched between thermoelectric elements (TE) 50 and 51 coupled to a heat sink (not shown). A high voltage DC supply 52 is connected to crystal 36 as shown. A temperature controller 55 is connected to a temperature sensor 57 and drives the thermoelectric elements to heat (or cool) crystal 36 and to provide a temperature read out.

Figure 4:
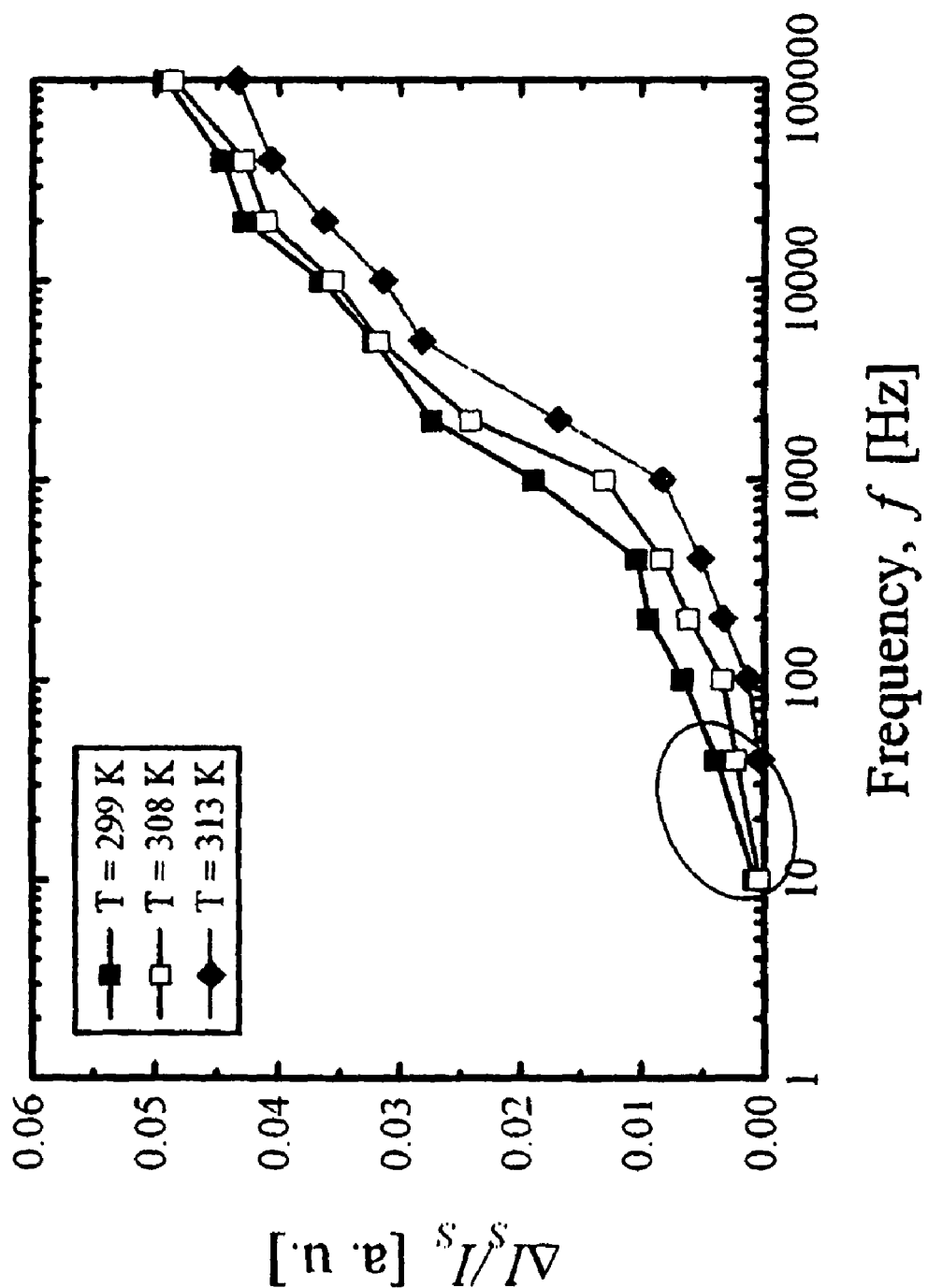
FIG. 4 is a graph showing fractional modulation as a function of frequency at three crystal temperatures observed from adaptive interferometer using CdTe crystal N330.
Figure 5:
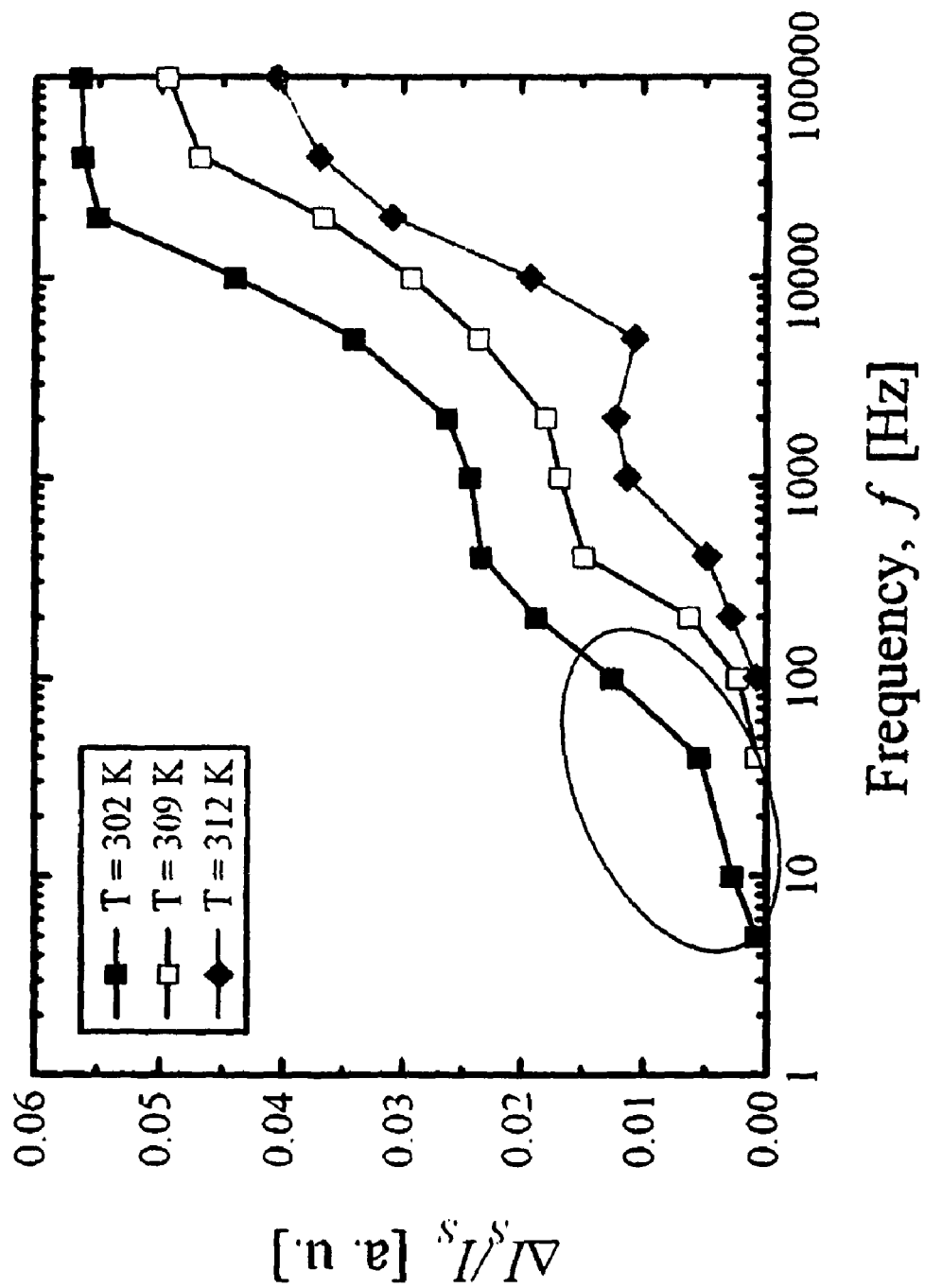
FIG. 5 is a graph showing fractional modulation as a function of frequency at three crystal temperatures observed from adaptive interferometer using CdTe crystal N300.

FIGS. 4 and 5 show the device response as a function of frequency for two different crystals. In broad terms, the plots have the expected behavior of insensitivity to perturbations at low frequencies and high sensitivity to the desired signals at frequencies in the ultrasonic range. In the figures the device response is plotted for three different temperatures. At the lowest temperature (essentially room temperature) there is a finite response at frequencies down to 10 Hz or below. As the crystal is heated, the response curves shift down and to the right, so that the lowest response frequency is close to 100 Hz. This data is a clear illustration of the benefit of crystal heating for improving the rejection of unwanted signals at low frequencies.

Figure 6:
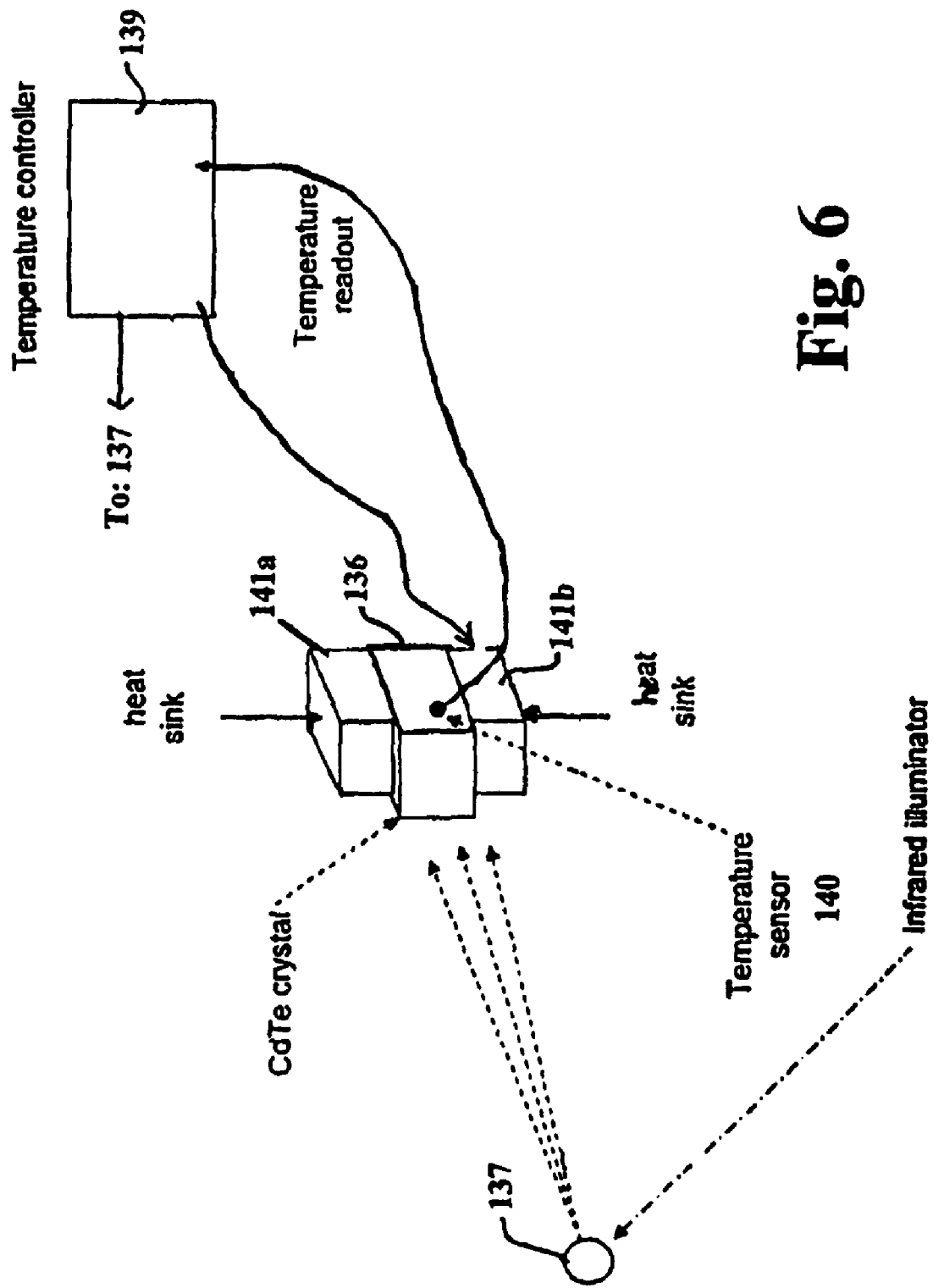
FIG. 6 is a schematic view of an alternative implementation for eliminating unwanted traps in the crystal beam splitter of FIGS. 1 and 2.

FIG. 6 shows an alternative arrangement for photoionizing traps and improving the frequency response of the crystal 136. The crystal is illuminated by an infrared lamp 137. The temperature controller 139, thermoelectric elements 141a and 141b and temperature sensor 140 are now used to maintain crystal 136 at a temperature near room temperature to control thermal runaway.

The foregoing description is considered merely illustrative of the principles of this invention and thereof it is within the purview of those skilled in the art to make various modifications thereof within the spirit and scope of the invention as encompassed by the following claims:

What is claimed is:
1. An optical homodyne interferometer comprising a semiconductor crystal adaptive beam splitter and a thermal control system adapted to maintain the crystal at a temperature between about 40 to 44 degrees Celsius at which unwanted shallow traps in the crystal are substantially emptied for achieving an optimized frequency response and runaway Joule heating of the crystal is mitigated.

2. An interferometer as in claim 1 wherein the thermal control system comprises a heating source comprising a source of infrared radiation as well as a temperature sensor and a controller.

3. An interferometer as in claim 1 wherein the crystal comprises Ge or V doped CdTe.

4. An interferometer as in claim 1 wherein the thermal control system comprises a heating source comprising one or more thermoelectric elements coupled to the crystal as well as a temperature sensor and a controller.

5. An optical homodyne interferometer comprising a II-VI semiconductor crystal adaptive holographic beam splitter comprising a thermal control system coupled to the crystal and adapted to maintain the crystal at a temperature between about 40 to 44 degrees Celsius at which unwanted shallow traps in the crystal are substantially emptied whereby the frequency response of the crystal is optimized and runaway Joule heating of the crystal is mitigated.

6. An interferometer as in claim 5 wherein the thermal control system comprises a heating source comprising one or more thermoelectric elements coupled to the crystal as well as a temperature sensor and a controller.

7. Apparatus for nondestructively evaluating a work piece comprising a first laser for directing a first beam at the surface of the work piece in a manner to cause an ultrasonic wave in a predetermined area of the work piece, a second laser for directing a second beam at a detection region of said work piece spatially related to the predetermined area within the ultrasonic wave, the apparatus also comprising an interferometer responsive to direct arriving and ultrasonic waves using light reflected from the temporally-displaced surface wherein the interferometer incorporates a II-VI semiconductor crystal and the apparatus includes an energy source for maintaining the crystal at a temperature between about 40 to 44 degrees Celsius whereby shallow traps are ionized and runaway Joule heating is mitigated.

8. Apparatus as in claim 7 where the interferometer incorporates a CdTe crystal.

9. Apparatus as in claim 7 wherein the energy source comprises a thermal control system operative to maintain the crystal in said temperature range.

10. An interferometer as in claim 7 wherein the energy source comprises a source of infrared radiation.

11. An interferometer as in claim 7 wherein the crystal comprises Ge or V doped CdTe.

12. Apparatus as in claim 7 wherein the energy source comprises one or more thermoelectric elements coupled to the crystal.

13. A method for detecting sonic vibrations in a test material having a test surface comprising:
 a. generating a coherent beam of light having a wavelength;
 b. splitting the coherent beam into a first beam and a second beam;
 c. directing the first beam onto the test surface to be scattered by the test surface to result in a scattered first beam having a first phase perturbation;
 d. directing at least a portion of the scattered first beam and the second beam at a crystal adaptive beam splitter, wherein the first and second beams are made co-propagating with superposed wavefronts and maintaining the crystal in a condition in which unwanted shallow traps in the crystal are emptied;
 e. directing the co-propagating superposed first and second beams onto a photodetector to result in an electrical output signal that is representative of the vibrating test surface;
 f. maintaining the crystal in a condition in which the unwanted shallow traps in the crystal are emptied by coupling the crystal to a source of energy adapted to heat the crystal in a temperature range, the range being selected between a lower limit and an upper limit wherein within said range shallow traps are substantially emptied and runaway Joule heating is mitigated.

14. The method of claim 13 in which the crystal is a CdTe crystal doped with germanium or vanadium (Ge or V) and the temperature range is about 40-44 degrees Celsius.

15. The method of claim 13 in which the energy source is a thermoelectric heating source.

16. The method of claim 13 in which the energy source is a source of infrared radiation.

17. The method of maintaining a semiconductor crystal adaptive holographic beam-splitter of an optical homodyne interferometer operative at an optimum frequency response comprising coupling the crystal to a source of energy and controlling the source to maintain the crystal in a temperature range at which shallow traps in the crystal are substantially emptied in a manner so that the crystal exhibits the optimum frequency response and runaway Joule heating is mitigated.

18. The method of claim 17 further comprising mitigating runaway Joule heating of the crystal by thermally controlling the crystal in a temperature range between Tmin and Tmax, wherein Tmin is the minimum temperature adapted to substantially empty shallow traps and Tmax is the maximum temperature at which runaway Joule heating is substantially mitigated.

19. The method of claim 17 in which the energy source comprises a thermoelectric source.

20. The method of claim 17 in which the energy source comprises a source of infrared radiation.

21. The method of claim 17 in which the crystal is a CdTe crystal doped with germanium or vanadium (Ge or V) and the temperature range is about 40-44 degrees Celsius.

* * * * *